3,231,346
SOLID PRODUCT CONTAINING NORMALLY
LIQUID HYDROCARBON AND NORMALLY
SOLID TRANS-DIENE POLYMER

Charles R. Wilder, Bartlesville, Okla., assignor to Phillips Petroleum Company, a corporation of Delaware
No Drawing. Filed Mar. 15, 1962, Ser. No. 180,005
7 Claims. (Cl. 44—7)

This invention relates to a solid or rigid product containing a normally liquid hydrocarbon and a normally solid trans-diene polymer. It also relates to a method of producing said product. In one of its aspects, the invention relates to a solid combustible composition comprising a major proportion of a liquid hydrocarbon and a minor proportion of a normally solid polymer of a conjugated diene having high trans-configuration content. In a further aspect of the invention, it relates to a method of preparing shaped fuel articles from trans-diene polymers and hydrocarbons.

Heretofore, there has been developed a considerable art relative to the manufacture of gelled fuels, the principal purpose of such products being as incendiary compositions for use in military operations. In some instances highly viscous solutions of natural or synthetic rubber in gasoline or similar hydrocarbon fuels have been used for such applications. However, these solutions are viscous liquids which flow to take the form of the containing vessel and are adhesive to surfaces with which they are contacted. By increasing the concentration of the rubber, viscosity is increased but even at high concentrations of rubber, such compositions are not form-stable.

I have now discovered that new and useful shaped fuel compositions comprising liquid fuels or hydrocarbon fractions and normally solid polymers can be prepared which exhibit a physical state and appearance which are, quite unexpectedly, those of the polymer alone in the sense that the composition obtained is a hard solid. Although compositions of varying degrees of hardness are obtained, the composition is at all times a solid, as distinguished from the semi-solid viscous character of a gel or the oily and syrupy liquid character of an oil.

Accordingly, it is an object of this invention to prepare a solid combustible composition derived from a normally solid trans-diene polymer, the normally solid polymer constituting but a minor proportion of the product.

Further, it is an object of this invention to solidify normally liquid hydrocarbons or fuels.

It is a further object of this invention to provide a method for the preparation of a normally solid, liquid hydrocarbon or fuel-containing product from which the liquid can be recovered.

Still further, it is an object of this invention to provide a normally solid fuel.

Other aspects, objects and the several advantages of this invention are apparent from a study of this disclosure and the appended claims.

According to the present invention, there are provided a solid combustible composition and a method for its preparation, the composition comprising a major proportion of a normally liquid hydrocarbon and a minor proportion of a normally solid high trans-content polymer of a diene having 4–5 carbon atoms in the molecule, or a mixture of the trans-diene polymer and a solid polyolefin, the method comprising essentially blending together the liquid hydrocarbon and the polymer at a temperature at which an essentially pourable solution or blend can be obtained, following which the solution is cooled, and, if desired, molded, to obtain a product exhibiting the physical characteristics and appearance of the polymer alone.

Compositions containing as much as 96 weight percent liquid hydrocarbon and only about 4 parts of a particular polymer, such as polybutadiene having a high trans-configuration content and which is normally solid in character, or a mixture of a conjugated diene trans-polymer and a solid polyolefin, can be made to exhibit the physical appearance and physical state which is characteristic of the polymers alone, as described.

A solid briquet has been prepared which contains 12.7 weight percent of a high trans-content butadiene polymer (trans-content approximately 87 percent) and about 87.3 weight percent of n-heptane. This briquet is hard, non-cohesive, can be handled as a solid, and when burned is completely consumed. Generally, the composition of the invention will contain from about 4 to about 40 percent by weight of polymeric material, and preferably will contain 5–20 percent of the solid polymer. The compositions which are now preferred, as indicated herein, contain considerably less than the upper limit of 40 weight percent polymers. Suffice to say, one skilled in the art in possession of this disclosure, having studied the same, now has given to him the concept that it is possible to obtain solid products containing substantial quantities of liquid hydrocarbons or fuels by combining such hydrocarbons or fuels with a normally solid trans-diene polymer, as herein described.

The polymer portion of the solid compositions of the invention comprises from 5 to 100 weight percent of a trans-diene polymer having a trans-1,4-addition content greater than about 70 percent, the remainder being a high molecular weight 1-olefin polymer as described more fully hereinbelow. Suitable trans-diene polymers include high trans-polybutadiene, high trans-polyisoprene, high trans-polypiperylene, and naturally occurring polymers of high trans-content such as balata and gutta percha. The preferred polymers are trans-polybutadiene and, particularly, polybutadiene having a trans-configuration content greater than about 85 percent. The synthetic high trans-diene polymers are prepared from 1,3-butadiene, isoprene or piperylene using any suitable polymerization procedure by which such structures can be obtained. One convenient process for the production of such polymers involves solution polymerization of a conjugated diene in the presence of an initiator system comprising lithium aluminum hydride and titanium tetraiodide. Polymers prepared in this manner will generally contain 90 percent or more of polymer formed by trans-1,4-addition.

The solid compositions of the invention can be prepared from normally liquid hydrocarbons or hydrocarbon mixtures or fuels which boil as low as hexane and as high as heavy cycle oil, i.e., from about 100° F. to about 900° F. and higher. Hydrocarbons that can be employed include saturated and unsaturated acyclic, saturated and unsaturated cyclic, aromatic hydrocarbons or mixtures or combinations thereof. Representative examples of suitable paraffinic materials include hexanes, octanes, decanes, pentadecanes and the like as well as mixtures of these materials. Also, suitable are petroleum refinery fractions such as gasolines, kerosenes, stove oils, furnace oils, gas oils, cycle oils, diesel fuels, crude oils, topped crude, and the like. The above hydrocarbon fractions ordinarly have flash points ranging from atmospheric to about 250° F. Preferred hydrocarbons are those paraffins or largely paraffinic mixtures or isoparaffinic mixtures which boil between about 200 and about 700° F. Still more preferred are those that boil between about 300 and about 500° F. When the compositions are used for burning, the paraffinic hydrocarbons are preferred because of their low smoke and cleaner burning properties.

The products of this invention sometimes tend slowly to lose the more volatile hydrocarbon component by simple evaporation. This is an advantage in situations in which it is desired to recover a substantially pure vapor by slow evaporation, which can be aided somewhat and, therefore, controlled as to its rate, by gently heating the composition. When desired to avoid all or substantially all loss by evaporation such as in storage, the product can be stored in a vapor-proof container or wrapping, e.g., aluminum foil, polyvinyl chloride, cellulose acetate, cellophane, Mylar (saturated polyester film), Saran (polymer of vinylidene chloride), polyvinyl alcohol, rigid polystyrene, metal cans, glass jars, bottles, and the like, capable of withstanding pressure which may be reached under the conditions of storage. Further, application of a thin coating of a substantially non-porous resinous or plastic solid material to the solidified hydrocarbon product which effectively seals the same and prevents substantially all loss of volatiles through evaporation can be employed. Coatings which are satisfactory for the purpose are commercial cellulose acetate-butyrate resins dissolved in a xylene-ketone solvent for purposes of application of the coating. Other coating materials that can be employed include cellulose nitrate-type lacquers, alkyd resins, phenolic coatings, carboxymethylcellulose, thermosetting resins such as phenol formaldehyde, melamine resins, and the like.

The utility of such solidified hydrocarbon compositions is readily apparent. These novel compositions are non-tacky, can be cut to any desired shape or size, and will retain their original form indefinitely. They can be used as fuels for quick cooking, as a source of heat for on-the-job repairs, starter fuel for outdoor grills and fireplaces, and numerous other applications in which a quick, clean, and readily portable source of heat is desired. For incendiary purposes in military operations, the compositions have obvious utility. One of the advantages of the compositions of the present invention is the fact that they are purely hydrocarbon and burn without ash or objectionable residues. Another advantage lies in the fact that while clean and non-tacky, the compositions become sticky when ignited and thus remain in place while burning, a particularly useful aspect of their applicability in military operations.

Another possible use is as a means for storing and transporting selected hydrocarbons. The solidified fuel acts as its own storage vessel and shipping container. When required, the hydrocarbon may be recovered in its original liquid form by simply distilling out the volatiles using heat and/or vacuum. When desired, the solid composition can be comminuted or shredded prior to removal of the volatiles.

In the exercise of this present invention, the hydrocarbon and polymer are brought together in a vessel or other apparatus and blended at a temperature and for a sufficient length of time to yield a homogeneous mixture. The temperature must be kept below that at which any appreciable degradation occurs. Temeratures of 10–60° C. above the melting point of the polymer have been found satisfactory for this blending operation. The temperature employed will vary depending upon the amount of trans-diene polymer present in the polymer portion of the composition, however, in general, the temperature utilized will range from about 40 to about 160° C. If this temperature is above the boiling point of the hydrocarbon, the operation is carried out in a pressurized vessel to maintain the components substantially in the liquid state. This blending operation is carried out until the contents of the vessel are completely homogeneous as indicated by its physical appearance. As little as two minutes at a higher temperature may be sufficient or as long as 24 hours may be required at a lower temperature. Blending of the polymer and hydrocarbon according to the invention can be carried out under batch, semi-continuous or continuous conditions, using suitable equipment therefor.

When the product has solidified sufficiently, a coating or sealer may be applied. The coating may be conveniently applied by dipping but may also be applied by spraying, brushing, or other means.

The proportions of hydrocarbon and polymer depend upon the nature of the hydrocarbon and more particularly upon the nature of the polymer. In general, the solidified composition will contain from about 4 to about 40 weight percent of polymer, preferably 5–20 weight percent, comprised of from 5 to 100 weight percent trans-diene polymer. Combinations of more than one type of polymer can be used if desired. Small amounts of other solid hydrocarbon materials such as paraffin wax can also be added, if desired. In this regard, it should be noted that I also contemplate within the scope of my invention the use of a mixed polymer comprising the trans-diene polymer described herein along with up to 95 weight percent of a high molecular weight olefin polymer. The use of the high molecular weight olefin polymer to form a solid combustible composition is more fully described in copending application Serial No. 180,024, filed March 15, 1962, by James E. Kepple.

The mixture of the trans-diene polymer and the high molecular weight olefin polymer can be made by a conventional dry blending of the polymers after which the polymer blend is incorporated into the liquid hydrocarbon, or the two polymers can be sequentially or simultaneously added separately to the liquid hydrocarbon. The polymer compositions, employed comprise from 5 to 100 weight percent trans-diene polymer, the remainder being a high molecular weight polyolefin. The total amount of polymers added to the liquid hydrocarbon should be within about 4 to about 40 weight percent of the resulting composition, and more preferably within about 5 to about 20 weight percent of the resulting composition.

The hydrocarbon-polymer compositions prepared according to the invention ordinarily have a gross heat of combustion ranging from about 20,000 to about 21,000 B.t.u.'s per pound.

Agitation, milling, or other forms of mixing, during the blending period is generally desirable. However, after the homogenization is complete, the mixture is allowed to cool and solidify without agitation. It is generally desirable to transfer the hot and still fluid product to another more convenient location before solidification begins where the desired shape of the finished product may be obtained. The solidified hydrocarbon can be cast, molded, or extruded, into any desired shape such as pellets, briquets, spheres, cubes, bars, or the like.

A better understanding of the invention can be obtained by referring to the following illustrative examples which are not intended, however, to be unduly limitation of the invention.

*Example 1*

The trans-polybutadiene employed in this example was a blend of products from a series of runs. In these runs, 1,3-butadiene was polymerized with a catalyst consisting of lithium aluminum hydride ($LiAlH_4$) and titanium tetraiodide ($TiI_4$) using cyclohexane as the diluent. Cyclohexane, which had previously been dried by purging with nitrogen, was charged to the reactor, lithium aluminum hydride was added as a 2.4 weight percent solution in ether, and then the titanium tetraiodide as a 1 weight percent dispersion in cyclohexane. After the introduction of these materials, 1,3-butadiene, which had been dried by passing it through silica gel, was charged to the reactor. At the end of the polymerization period, water was added to stop the reaction and the unreacted butadiene was removed under vacuum. The polymer solution was stabilized with phenyl-beta-naphthylamine dissolved in toluene at a level of 1.5 parts by weight per 100 parts of polymer. After washing the polymer with hot acid and water, the trans-polybutadiene was flocced by steam stripping under vacuum for a period of five hours. The flocced polymer was dried in an extrusion drier at a temperature of approximately 300° F. The extruded material was then water quenched after which surface moisture was removed in a tray drier. The conditions under which the runs were conducted as well as certain properties of the products are summarized in the following table.

|  | Runs | | | | |
|---|---|---|---|---|---|
|  | 1 | 2 | 3 | 4 | 5 |
| 1,3-Butadiene, parts by weight | 100 | 100 | 100 | 100 | 100 |
| Cyclohexane, parts by weight | 780 | 780 | 780 | 780 | 780 |
| LiAlH₄, parts by weight | 0.133 | 0.129 | 0.129 | 0.137 | 0.132 |
| TiI₄, parts by weight | 2.28 | 2.22 | 2.22 | 2.35 | 2.26 |
| Polymerization Temperature, °F | 122-160 | 122-164 | 122-162 | 122-155 | 122-160 |
| Time, hours | 9.5 | 10.0 | 16.1 | 8.0 | 8.0 |
| Conversion, percent | 88 | 87 | 88 | 84 | 86 |
| ML-4 at 212° F.¹ | 32 | 41 | 30 | 29 | 25 |
| Inherent viscosity ² | 1.79 | 1.94 | 1.69 | ³ 1.60 | |
| Microstructure, percent ⁴: | | | | | |
| Cis | 10.6 | 9.4 | 9.6 | ³ 11.2 | |
| Trans | 87.1 | 88.3 | 88.2 | ³ 86.5 | |
| Vinyl | 2.3 | 2.3 | 2.2 | ³ 2.3 | |

¹ ASTM D927-55 T.
² One tenth gram of polymer was placed in a wire cage made from 80 mesh screen and the cage was placed in 100 ml. of toluene contained in a wide mouth-4 ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
³ Determined on a blend from runs 4 and 5.
⁴ Determined according to the method of Silas, Yates and Thornton, Anal. Chem. 31, 529 (1959).

The proportions of each of the polymers used in the blend were as follows:

|  | Pounds |
|---|---|
| Run 1 | 12.4 |
| Run 2 | 12.9 |
| Run 3 | 12 |
| Blends of runs 4 and 5 | 25 |

Ten grams of the trans-polybutadiene blend (25 ML-4 at 212° F., 87 percent trans) were dissolved in 100 ml. of normal heptane by heating in a water bath at 60° C. The solution was poured into a cylindrical container and cooled to room temperature whereupon it set up to a white solid. To test for stability a section was cut from one side of the block after which it was set aside in a closed glass container to determine whether cold flow would occur. After 60 days, no change in form was observed, even knife marks remaining unchanged. A sample placed on a metal plate and ignited burned with a hot flame and was completely consumed (no noticeable residue). During the burning, the solid became sticky and remained in place without significant spreading.

Example II

The experiment of Example I was repeated using 10 grams of transpolybutadiene (91 percent trans, freezing point 200° F., 25 ML-4 at 230° F.) and 100 milliliters normal heptane. The trans-polybutadiene was prepared in the presence of cyclohexane and a lithium aluminum hydride-titanium tetraiodide initiator system in a manner similar to that set forth in Example I. Solution was effected at 60° C. Upon cooling to room temperature a solid, form-stable block was formed. As a control, 10 grams of natural rubber Hevea (No. 1 Smoked Sheet) were dissolved in 100 ml. normal heptane in the same manner. Upon cooling, a viscous sticky cement was formed which showed no tendency to set up after about 10 days at room temperature.

Example III

Blends of trans-polybutadiene and polyethylene were prepared which contained trans-polybutadiene (25 ML-4, 91% trans) in the amounts of 10, 50, and 90 parts per hundred parts of total polymer. The trans-polybutadiene was the same polymer as employed in Example II. The polyethylene employed was prepared by polymerizing ethylene over a chromium oxide catalyst (U.S. Patent No. 2,825,721 to Hogan et al.) and had a 0.96 density and a melt index of 4. These blends were used in preparing solid fuel compositions using 10 grams of polymer blend with 90 ml. of a 100 percent paraffinic oil having an initial boiling point of 443° F., an API gravity of 48.2, and flash point of 210° F. In preparing the blends the mixture of polymer and oil was placed in a vessel and heated on an oil bath at 320° F. with stirring until dissolved. The solution was molded into 1" x 1½" cylindrical molds and when cooled formed solid pellets which when ignited burned freely. The pellets formed with 25 and 50 parts of polyethylene in the polymer blend were firm and form stable, similar in appearance to those made with trans-polybutadiene alone described in Examples I and II. With 90 parts polyethylene in the polymer blend, some syneresis was observed.

Example IV

A solid combustible composition was prepared from balata and normal heptane. The composition was prepared by blending together 10 grams of balata and 100 ml. of n-heptane. Blending was effected on a 60° C. bath until the balata was in solution. The blend set up into a solid upon cooling to room temperature. Briquets formed from the solid composition attained will ignite and burn readily.

The high molecular weight solid 1-olefin polymers that can be employed for blending with trans-diene polymers according to the invention include polymers of 1-olefins having from 2 to 8 carbon atoms per molecule. The term "polymers of 1-olefins" includes homopolymers of the above described 1-olefins as well as copolymers of these 1-olefins with each other. Representative examples of suitable 1-olefins include ethylene, propylene, butene-1, pentene-1, hexene-1, heptene-1, 4-methylpentene-1, 5-methylhexene-1, 4,4-dimethylhexene-1, 4-ethylhexene-1, octene-1 and the like. Suitable olefin polymers include polyethylene, polypropylene, poly-1-butene, poly-1-pentene and the like. The ethylene polymers preferred have a density ranging from 0.93 to 1.00, preferably from 0.94 to 0.98. The term "ethylene polymers" includes homopolymers of ethylene as well as copolymers of ethylene with minor amounts of higher olefins copolymerizable therewith such as propylene, 1-butene, 1-hexene, butadiene, isoprene, and the like. The preferred polypropylenes and poly-1-butenes have an isotactic content of at least 70%. The more preferred polymers are polyethylene and particularly high density polyethylene having an average molecular weight greater than about 100,000. A particularly preferred polyethylene is one prepared according to the method described and claimed in Patent No. 2,825,721, issued March 4, 1958, to John Paul Hogan and Robert L. Banks. However, the polymers applicable according to the invention can be prepared by any known method as long as the polymers have the above described properties. The ethylene polymers can be prepared by any of the known solution processes as well as the "particle form" process (polymerization of 1-olefins is carried out in suspension and below temperature at which any substantial portion of the polymer formed is in solution in the suspending medium).

As will be evident to those skilled in the art, many variations and modifications of this invention can be practiced in view of the foregoing disclosure. Such variations and modifications are clearly believed to come within the spirit and scope of the invention.

I claim:

1. A solid combustible composition comprising 60–96 weight percent of a normally-liquid hydrocarbon fuel boiling at a temperature between about 100° F. and about 900° F. and 4–40 weight percent of a normally solid polymer having at least 70 percent trans-configuration formed by polymerizing at least one conjugated diene having 4–5 carbon atoms per molecule.

2. The composition of claim 1 wherein said normally-solid polymer comprises from about 5 to about 20 weight percent of the composition, and said hydrocarbon fuel boils at a temperature between about 300° F. and about 500° F.

3. A solid combustible composition comprising 60–96 weight percent of a normally-liquid hydrocarbon fuel boiling at a temperature between about 100° F. and about 900° F. and 4–40 weight percent of normally-solid polymers comprising a first polymer having at least about 70 percent trans-configuration formed by polymerizing at least one conjugated diene having 4–5 carbon atoms per molecule and a second high molecular weight polymer formed by polymerizing at least one 1-olefin having 2–8 carbon atoms per molecule, said second polymer comprising up to 95 weight percent of said normally-solid polymers.

4. The composition of claim 3 wherein said first polymer is polybutadiene, said second polymer is polyethylene, and said normally-solid polymers comprise from about 5 to about 20 weight percent of the composition.

5. A method for preparing a shaped, solid combustible composition which comprises blending together 4–40 weight percent of a normally-solid polymer having at least about 70 percent trans-configuration formed by polymerizing at least one 4–5 carbon atom conjugated diene and 60–96 weight percent of a normally-liquid hydrocarbon fuel boiling at a temperature between about 100° F. and about 900° F. at a temperature at which a homogeneous liquid is obtained, and then cooling the liquid to obtain a solid of the desired geometric configuration.

6. A method of preparing a shaped, solid combustible composition which comprises blending together 4–40 weight percent of normally-solid polymers comprising a first polymer having at least about 70 percent trans-configuration formed by polymerizing at least one conjugated diene having 4–5 carbon atoms per molecule and a second polymer formed by polymerizing at least one 1-olefin having 2–8 carbon atoms per molecule, said second polymer comprising up to 95 weight percent of said normally-solid polymers, and 60–96 weight percent of a normally-liquid hydrocarbon fuel boiling at a temperature between about 100° F. and about 900° F. at a temperature at which a homogeneous liquid is obtained, and then cooling the liquid to obtain a solid of the desired geometric configuration.

7. The method of claim 6 wherein said first polymer is polybutadiene, said second polymer is polyethylene, and said normally-solid polymers comprise from about 5 to about 20 weight percent of the composition.

References Cited by the Examiner

UNITED STATES PATENTS

| | | | |
|---|---|---|---|
| 2,445,311 | 7/1948 | Cooke et al. | 44—7 |
| 2,810,695 | 10/1957 | Young et al. | 252—59 X |
| 2,825,721 | 3/1958 | Hogan et al. | 252—59 X |
| 3,076,764 | 2/1963 | Hansen et al. | 252—59 |
| 3,084,033 | 4/1963 | Kelly et al. | 44—7 |

DANIEL E. WYMAN, *Primary Examiner.*